G. H. WHEATLEY.
METHOD OF AND APPARATUS FOR MAKING RESILIENT TIRES.
APPLICATION FILED MAY 1, 1920.

1,432,004.

Patented Oct. 17, 1922.

George H. Wheatley
Inventor
By Delos G. Haynes
Attorney

G. H. WHEATLEY.
METHOD OF AND APPARATUS FOR MAKING RESILIENT TIRES.
APPLICATION FILED MAY 1, 1920.
1,432,004.
Patented Oct. 17, 1922.
3 SHEETS—SHEET 2.
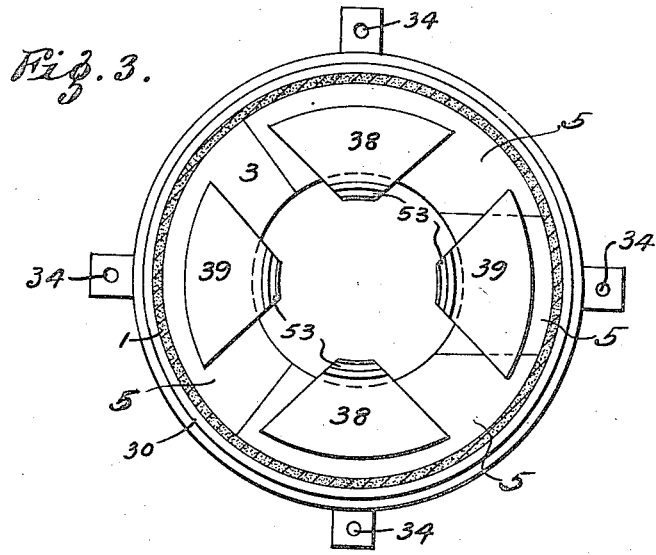
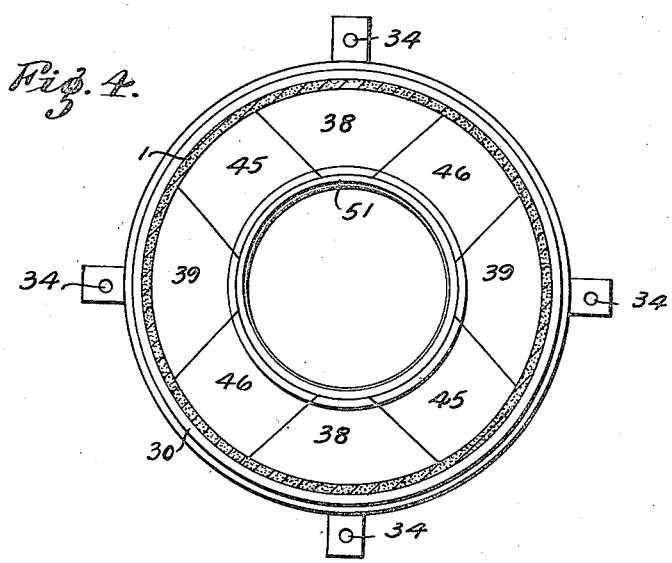

G. H. WHEATLEY.
METHOD OF AND APPARATUS FOR MAKING RESILIENT TIRES.
APPLICATION FILED MAY 1, 1920.
1,432,004.
Patented Oct. 17, 1922.
3 SHEETS—SHEET 3.
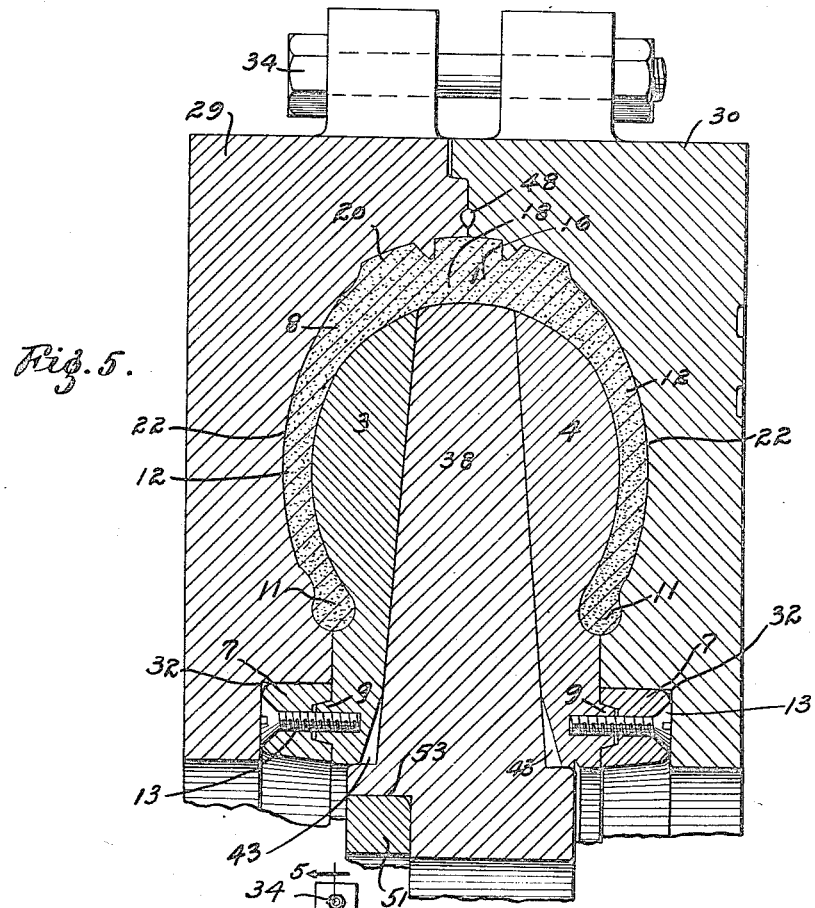
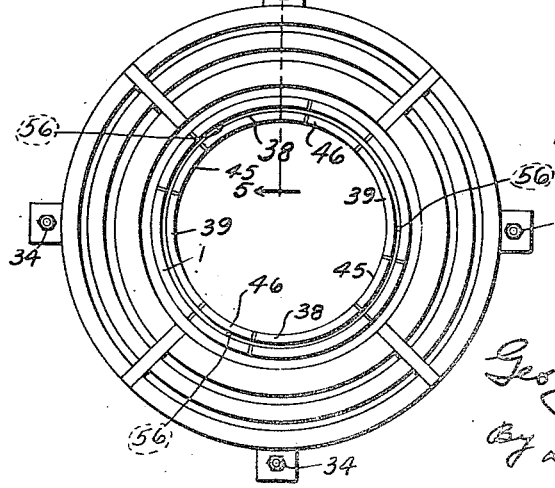
George H. Wheatley,
Inventor.
By Delor G. Haynes,
Attorney.

Patented Oct. 17, 1922.

1,432,004

UNITED STATES PATENT OFFICE.

GEORGE H. WHEATLEY, OF CHICAGO, ILLINOIS.

METHOD OF AND APPARATUS FOR MAKING RESILIENT TIRES.

Application filed May 1, 1920. Serial No. 378,083.

*To all whom it may concern:*

Be it known that I, GEORGE H. WHEATLEY, a citizen of the United States, and a resident of Chicago, county of Cook, State of Illinois, have invented an Improvement in Methods of and Apparatus for Making Resilient Tires, of which the following is a specification.

This invention relates to resilient tires, and with regard to certain more specific features, to a method of and apparatus for making cord or fabric tires. The present invention is in its general features similar to the invention set forth in my Patent No. 1,405,470, dated February 7, 1922, but relates to the so-called non-extensible bead type of tire, as distinguished from the extensible bead type, shown in said application.

Among the several objects of the invention may be noted the provision of a simple and comparatively inexpensive method of making a resilient tire of the non-extensible bead type; and the provision of efficient, reliable and durable apparatus for constructing such a tire. Other objects will be in part obvious and in part pointed out hereinafter.

The invention accordingly consists in the elements and combinations of elements, features of construction, steps and sequence of steps, and arrangement of parts which will be exemplified in the structure hereinafter described and the scope of the application of which will be indicated in the following claims.

In the accompanying drawings, in which is shown one of various possible embodiments of the invention, Fig. 1 is a transverse section showing the tire partly built up;

Fig. 3 is a longitudinal section showing the tire partly expanded, that is, in a condition subsequent to the one shown in Fig. 2 and prior to the one shown in Figs. 4, 5 and 6;

Fig. 4 is a similar view showing tire expanded, ready for curing;

Fig. 5 is a transverse section on the line 5—5 of Fig. 6;

Fig. 6 is a face view of Fig. 5.

Similar reference characters indicate corresponding parts throughout the several views of the drawings.

Figure 1:
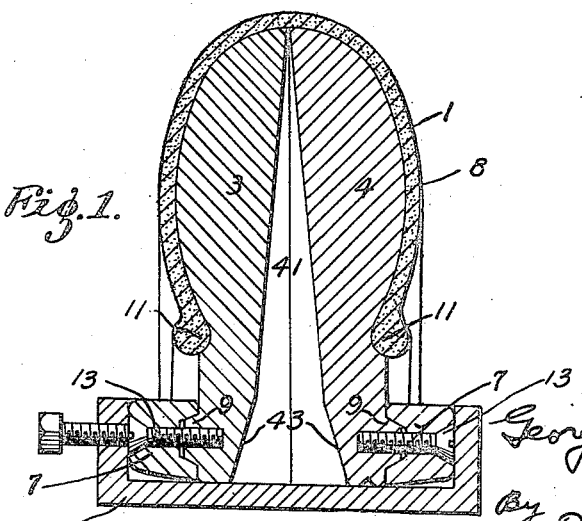

Referring now more particularly to Fig. 1 of the drawings, there is illustrated at 1 a tire mounted on the two halves or sections 3, 4 of a core, each half comprising a plurality of segments 5 (Fig. 3), held in operative position by such means as the rings 7 (Figs. 1, 2 and 5) each fitting around a boss 9 on the adjacent segments 5 and secured thereto by screws 13. The halves 3, 4 are held in proper relative position by means of a clamp 6. The tire is shown as partly built up. The first few plies 8 of rubber-impregnated strands have been applied to the core 3, 4, and the beads 11, in this instance non-extensible or substantially so, have been placed in position.

Figure 2:
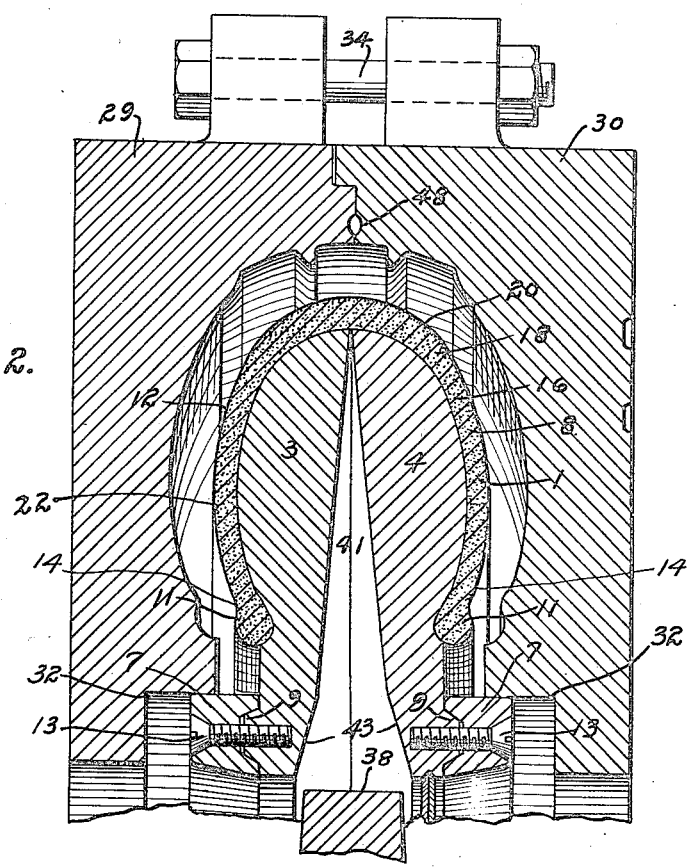
Fig. 2 is a similar view of the tire built up and ready for expansion.

In the next figure, Fig. 2, is shown the tire completely built up. The additional plies 12 of rubber-impregnated strands have been applied, the plies have been trimmed, the chafing-strip 14, if one is used, is in position, and the cushion 16, breaker 18, tread 20 and side walls 22 have all been applied to the tire. The strands are preferably cords, though fabric may be used. The two halves 29, 30 of the mold have been placed in position with respect to the tire and core, the rings 7 entering the annular recesses 32 in the mold. The mold halves have been clamped together by bolts 34 passing through integral lugs on the mold halves 29, 30. And the clamp 6, which was shown in Fig. 1 as holding the core sections together, has been removed.

The expanding operation is effected by means of two pairs of wedge devices, (Figs. 3 and 6). One of the wedges 38 is shown in Fig. 2 as ready to enter the recess 41 between the core halves 3, 4, which are preferably relieved as at 43 to facilitate entrance of the wedges 38, 39, into said recess.

As the wedges approach their final position, the rubber fills the cavity of the mold, any excess flowing into the overflow cavity 48.

The expanding operation may be carried on manually or by suitable mechanism. In the present instance, the parts are shown adapted for manual operation. This comprises simply driving the wedges 38 and then the wedges 39 into the recess 41 as far as they can conveniently be driven, that is, to about the position illustrated in Fig. 3. Then the two pairs 45, 46 of spacers are driven into the portions of the recess 41 not filled by the wedges 38, 39. As the spacers approach their final position as shown in Fig. 6, it becomes easier to drive the wedges 38, 39 home. Thus the wedges and the spacers are all driven into their final positions and the ring 51 is driven into the recess 53 in the wedges and spacers, to hold the core in position throughout the curing operation. The tire is now in the condition shown in Figs. 5 and 6, ready for curing.

The expansion effected as above described causes a definite stretch of the cords, expanding the tire to a definite size, and tightening the cords to such an extent as to minimize or eliminate any irregularities in the disposition of the cords either during or after curing, due to flowing of the rubber or to any other cause. It is practicable with the power available in the wedges, to stretch the cords to any desired extent without the attendant breakage of the expanding device so prevalent in the use of air bags and other prior devices for stretching these cords. Furthermore, the tolerance in the quantity of rubber is greater with the present invention than with devices of the prior art, since even a comparatively great flowing of rubber during curing, with the present invention, does not disarrange the tightly stretched cords or interfere with the effectiveness of the completed article.

The curing operation is carried on in the usual way, preferably in a closed or French press, the tires being banked in the press in any convenient quantity and arrangement. Owing to the high thermal conductivity of the material inside the tire, that is, the core and wedge devices, a greater uniformity of curing temperature throughout the tire may be obtained. This lessens the maximum temperature needed as compared with other apparatus, and reduces both the time of curing and the heat required, as well as minimizing the losses due to imperfect curing.

As above noted, the tire herein illustrated is of the non-extensible bead type. It is for this reason that the core halves 3, 4 are made of collapsible segments 5. When the tire is ready to be removed from the core and mold, the mold is taken apart by loosening the bolts 34. Ring 51 is then pushed out of position by rods driven through the apertures 56 in the spacers and wedges. The spacers and wedges are then moved radially inward, permitting the core halves 3, 4 to approach one another axially. Then the rings 7 are removed, after which the segments 5 may be collapsed and the tire taken off.

From the above it is clear that with the apparatus and process of the present invention, a non-extensible bead tire of high quality may be made inexpensively, with minimum waste and with apparatus both simple in construction and readily operable by comparatively unskilled labor.

In view of the above, it will be seen that the several objects of the invention are achieved and other advantageous results attained.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim:

1. The method of making a non-extensible bead tire, which comprises building up the tire on an expansible core, and expanding the core sections axially of the tire.

2. The method of making a non-extensible bead tire, which comprises building up the tire on a core expansible axially and collapsible radially, expanding the core sections axially of the tire, and thereafter collapsing said sections axially and radially to permit removal of the tire.

3. The method of making a non-extensible bead tire, which comprises building up the tire on a core, expanding the core axially of the tire to a predetermined extent, vulcanizing the tire, collapsing the core sections axially of the tire, collapsing the core sections radially of the tire and removing the tire.

4. The method of making a non-extensible bead tire, which comprises building up the tire on an expansible core, inserting wedges to separate the core sections axially of the tire, driving the wedges into final position, holding the wedges in place, and curing the tire.

5. The method of making a non-extensible bead tire, which comprises building up the tire on an axially expansible core having segments held in circular relation by rings, applying a mold outside the core and rings, the rings fitting into recesses in the mold to hold the rings against displacement, and separating the core sections axially of the tire.

6. The method of making a non-extensible bead tire, which comprises building up the tire on a sectional expansible core, having rings outside the core sections to hold the segments thereof against displacement, applying a sectional mold outside the core and rings, the rings fitting into recesses in the mold to hold the rings against displacement, fastening the mold sections together, inserting wedges to separate the core sections axially of the tire, inserting wedge-shaped spacers between adjacent wedges to fit the interstices between adjacent wedges, and driving spacers and wedges into final position.

7. The method of making a non-extensible bead tire, which comprises building up the tire on a sectional expansible core, applying a sectional mold outside the core, fastening the mold sections together, inserting wedges to separate the core sections axially of the tire, inserting wedge-shaped spacers between adjacent wedges to fit the interstices between adjacent wedges, driving spacers and wedges into final position, applying a ring in a recess formed on the spacers and wedges to hold the spacers and wedges in place, curing the tire, removing the mold, and collapsing the core axially and radially.

8. Apparatus for making non-extensible bead tires, comprising an axially expansible and radially collapsible core on which the tire is built up, means for holding the core parts against displacement, a sectional mold adapted to be applied outside the core, wedges for expanding the core axially of the tire, and spacers adapted to be inserted between adjacent wedges to fit the interstices between adjacent wedges.

9. Apparatus for making non-extensible bead tires, comprising an axially expansible core on which the tire is built up, a sectional mold adapted to be applied outside the core, wedges for expanding the core axially of the tire, spacers adapted to be inserted between adjacent wedges to fit the interstices between adjacent wedges, and means for holding the wedges and spacers in place.

10. Apparatus for making non-extensible bead tires, comprising a sectional segmental axially expansible and radially collapsible core on which the tire is built up, rings adapted to be applied outside the core sections to hold the segments thereof against displacement, a sectional mold adapted to be applied outside the core and rings, the rings fitting into recesses in the mold to hold the rings against displacement, means for fastening the mold sections together, wedges for expanding the core axially of the tire, wedge-shaped spacers adapted to be inserted between adjacent wedges to fit the interstices between adjacent wedges, and a ring adapted to be inserted in a recess formed on the wedges and spacers to hold the wedges and spacers in place.

11. Apparatus for making non-extensible bead tires, comprising a sectional segmental axially expansible and radially collapsible core on which the tire is built up, a sectional mold adapted to be applied outside the core, wedges adapted to be inserted between the core sections for expanding the core axially, and a ring adapted to be inserted in a recess formed on the wedges to hold the wedges in place.

12. A core for making non-extensible bead tires, comprising annular radially collapsible members, and means for holding the parts of each member in circular position, the members, when assembled, having a recess between them and adapted to be separated axially by wedges driven into said recess.

In testimony whereof, I have signed my name to this specification this 27th day of April, 1920.

GEORGE H. WHEATLEY.